United States Patent
Kawai et al.

(10) Patent No.: US 10,610,834 B2
(45) Date of Patent: Apr. 7, 2020

(54) ASYMMETRIC MEMBRANE

(71) Applicant: MITSUBISHI GAS CHEMICAL COMPANY, INC., Tokyo (JP)

(72) Inventors: Ryuichiro Kawai, Tokyo (JP); Takashi Yamamoto, Tokyo (JP); Daisuke Ohno, Tokyo (JP); Yohei Abiko, Kanagawa (JP); Hiroaki Oka, Okayama (JP); Shuya Suenaga, Kanagawa (JP); Takafumi Takada, Kanagawa (JP); Tomohiro Hariu, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 16/487,581

(22) PCT Filed: Jan. 30, 2019

(86) PCT No.: PCT/JP2019/003204
§ 371 (c)(1),
(2) Date: Aug. 21, 2019

(87) PCT Pub. No.: WO2019/151337
PCT Pub. Date: Aug. 8, 2019

(65) Prior Publication Data
US 2019/0381463 A1    Dec. 19, 2019

(30) Foreign Application Priority Data

Feb. 5, 2018   (JP) ................................ 2018-018307
Dec. 28, 2018  (JP) ................................ 2018-248386

(51) Int. Cl.
| | | |
|---|---|---|
| *B01D 71/64* | (2006.01) | |
| *C08G 73/10* | (2006.01) | |
| *B01D 69/08* | (2006.01) | |
| *B01D 53/22* | (2006.01) | |
| *B01D 69/02* | (2006.01) | |

(52) U.S. Cl.
CPC .......... *B01D 71/64* (2013.01); *B01D 53/228* (2013.01); *B01D 69/02* (2013.01); *B01D 69/08* (2013.01); *C08G 73/1078* (2013.01); *B01D 2053/224* (2013.01); *B01D 2325/022* (2013.01)

(58) Field of Classification Search
CPC .......... B01D 53/228; B01D 2053/224; B01D 69/02; B01D 69/08; B01D 71/64; B01D 2323/30; B01D 2325/022; C08G 73/1067; C08G 73/1078; C08G 73/1082
See application file for complete search history.

(56) References Cited

U.S. PATENT DOCUMENTS

| | | | | |
|---|---|---|---|---|
| 2013/0079490 A1* | 3/2013 | Matsumoto | ........ | C08G 73/1078 |
| | | | | 528/128 |
| 2017/0291146 A1* | 10/2017 | Chou | ...................... | B01D 71/64 |
| 2017/0313821 A1* | 11/2017 | Oka | .................... | C08G 73/1078 |
| 2018/0085716 A1* | 3/2018 | Hironaka | ............. | B01D 53/228 |

FOREIGN PATENT DOCUMENTS

| | | |
|---|---|---|
| JP | 03-001055 | 1/1991 |
| JP | 2017-133027 | 8/2017 |
| JP | 2017-176986 | 10/2017 |
| JP | 2018-122280 | 8/2018 |
| WO | 2011/099518 | 8/2011 |
| WO | 2017/002407 | 1/2017 |
| WO | 2018/088543 | 5/2018 |

OTHER PUBLICATIONS

International Search Report issued in International Patent Application No. PCT/JP2019/003204, dated Mar. 19, 2019.
Decision to Grant a Patent (Office Action) in Japan Patent Appl. No. 2019-524468, dated Jun. 4, 2019 with English translation.

* cited by examiner

*Primary Examiner* — Jason M Greene
(74) *Attorney, Agent, or Firm* — Greenblum & Bernstein, P.L.C.

(57) ABSTRACT

An asymmetric membrane including a crosslinked polyimide resin, the crosslinked polyimide resin being formed by crosslinking a polyimide resin by a crosslinking agent; the polyimide resin including a structural unit (A) derived from tetracarboxylic dianhydride and a structural unit (B) derived from diamine; the structural unit (A) including a structural unit (A-1) derived from a compound represented by Formula (a-1); the structural unit (B) including a structural unit (B-1) derived from Formula (b-1), and a proportion of the structural unit (B-1) per 100 mol % of the structural unit (B) being from 0.1 to 50 mol %; and the crosslinking agent being a compound having not less than two functional groups that bond with carboxy groups.

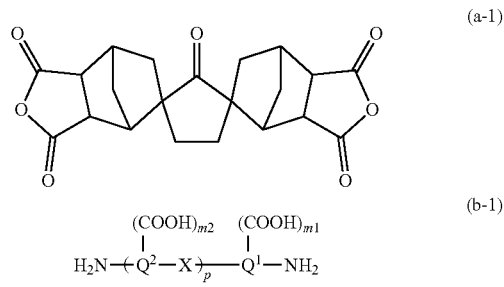

In Formula (b-1), $Q^1$ and $Q^2$ are each independently a group including an aromatic group, an aliphatic hydrocarbon group, and/or an alicyclic hydrocarbon group; X is a single bond or a particular group.

9 Claims, No Drawings

ASYMMETRIC MEMBRANE

TECHNICAL FIELD

The present invention relates to an asymmetric membrane that is useful for exhaust gas separation treatment, gas separation for industrial gases, and the like.

BACKGROUND ART

The greenhouse gas emission reduction targets for developed countries were set in the Conference of the Parties of the UN Framework Convention on Climate Change in 1997. Thus, reduction in emission of $CO_2$ gas, whose emission to the air is the largest among greenhouse gases, is required. Meanwhile, a gas separation membrane that selectively separates a target gas from a gas mixture is known. Especially, a polymeric gas separation membrane has excellent permeability and processability, and is expected to be employed for the use in separating $CO_2$ gas, which is emitted in a large amount in thermal power stations, factories, and the like. For example, Patent Document 1 describes that gas separation membranes formed from cellulose acetate have been industrially widely used.

Furthermore, Patent Document 2 discloses a gas separation membrane including a gas separation layer including a polyimide compound including a particular diamine, represented by 3,5-dinitro-2,4,6-trimethylbenzenesulfonamide, to provide a gas separation membrane achieving both excellent gas permeability and excellent gas separation selectivity, exhibiting excellent gas permeability and excellent gas separation selectivity even under high pressure conditions, and having a gas separation layer that is less likely to be affected by impurities, such as toluene, present in natural gas.

CITATION LIST

Patent Literature

Patent Document 1: JP 03-001055 B2
Patent Document 2: WO 2017/002407

SUMMARY OF INVENTION

Technical Problem

However, cellulose esters, such as cellulose acetate described in Patent Document 1, have poor solubility in solvents, and problems of poor processability arise when processing cellulose ester into a film shape or the like. Furthermore, while even more improved efficiency is in demand, sufficient performance is not achieved yet from the perspective of balance between the $CO_2$ permeability and the $CO_2$ selectivity.

Furthermore, the polymeric membrane may undergo plasticization of the polymeric membrane when being exposed to a high pressure during separation of a gas, such as natural gas. In a plasticized polymeric membrane, $CO_2$ selectivity is reduced. In addition, occasionally, the $CO_2$ selectivity is reduced irreversibly due to plasticization. When irreversible reduction in the $CO_2$ selectivity occurs, the $CO_2$ selectivity may not recover even when the polymeric membrane is taken out into the air. Thus, its product life is problematically reduced.

Patent Document 2 discloses a gas separation membrane including an aromatic polyimide, which uses tetraisopropyl orthotitanate or the like as a crosslinking agent, as a separation layer. This gas separation membrane exhibited good plasticization resistance against impurities, such as toluene; however, no specific description and consideration were made regarding irreversible reduction in $CO_2$ selectivity that may be caused by high pressure $CO_2$.

An object of the present invention is to provide an asymmetric membrane that achieves both excellent $CO_2$ permeability and excellent $CO_2$ selectivity in a compatible manner and that is useful as a gas separation membrane having a high recovery rate of the $CO_2$ selectivity.

Solution to Problem

As a result of diligent research to solve the problems described above, the inventors of the present invention found that an asymmetric membrane including a crosslinked polyimide resin formed by subjecting a polyimide resin to crosslinking by using a crosslinking agent, the polyimide resin having a repeating unit with a particular structure, can solve the problems described above and thus completed the present invention.

That is, the present invention relates to an asymmetric membrane described below.

<1> An asymmetric membrane including a crosslinked polyimide resin, the crosslinked polyimide resin being formed by crosslinking a polyimide resin by a crosslinking agent; the polyimide resin including a structural unit (A) derived from tetracarboxylic dianhydride and a structural unit (B) derived from diamine; the structural unit (A) including a structural unit (A-1) derived from a compound represented by Formula (a-1) below; the structural unit (B) including a structural unit (B-1) derived from Formula (b-1) below, and a proportion of the structural unit (B-1) per 100 mol % of the structural unit (B) being from 0.1 to 50 mol %; and the crosslinking agent being a compound having not less than two functional groups that bond with carboxy groups.

[Chemical Formula 1]

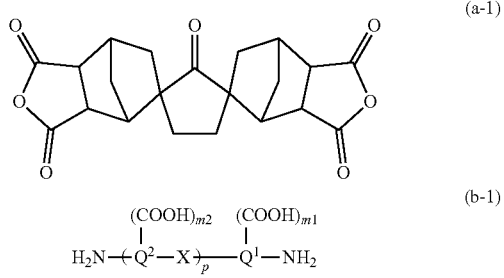

In Formula (b-1), $Q^1$ and $Q^2$ are each independently a group including an aromatic group, an aliphatic hydrocarbon group, and/or an alicyclic hydrocarbon group; X is a single bond, a substituted or unsubstituted alkylene group, a carbonyl group, an ether group, a group represented by Formula (b-1-i) below, or a group represented by Formula (b-1-ii) below; p is an integer from 0 to 2; m1 is an integer from 0 to 4; and m2 is an integer from 0 to 4. However, in the case where p is 0, m1 is an integer from 1 to 4.

[Chemical Formula 2]

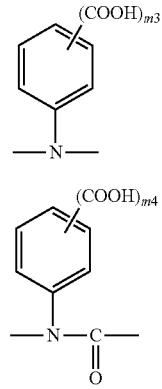

(b-1-i)

(b-1-ii)

In Formula (b-1-i), m3 is an integer from 0 to 5; in Formula (b-1-ii), m4 is an integer from 0 to 5. Note that, in Formula (b-1), m1+m2+m3+m4 is 1 or greater; and in the case where p is 2, two X moieties and two m2 to m4 are each independently selected.

<2> The asymmetric membrane described in <1> above, where the structural unit (B-1) is a structural unit (B-1-1) derived from a compound represented by Formula (b-1-1) below.

[Chemical Formula 3]

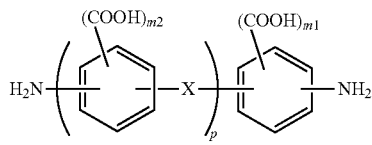

(b-1-1)

In Formula (b-1-1), X, p, m1, and m2 are the same as X, p, m1, and m2 of Formula (b-1) above.

<3> The asymmetric membrane described in <1> or <2> above, where the structural unit (B-1) is a structural unit (B-1-11) derived from a compound represented by Formula (b-1-11) below.

[Chemical Formula 4]

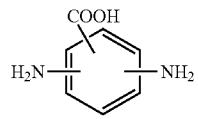

(b-1-11)

<4> The asymmetric membrane described in any one of <1> to <3> above, where the structural unit (B) further includes at least one structural unit (B-2) selected from the group consisting of a structural unit (B-2-1) derived from a compound represented by Formula (b-2-1) below, a structural unit (B-2-2) derived from a compound represented by Formula (b-2-2) below, and a structural unit (B-2-3) derived from a compound represented by Formula (b-2-3) below, and a proportion of the structural unit (B-2) per 100 mol % of the structural unit (B) is from 10 to 99.9 mol %.

[Chemical Formula 5]

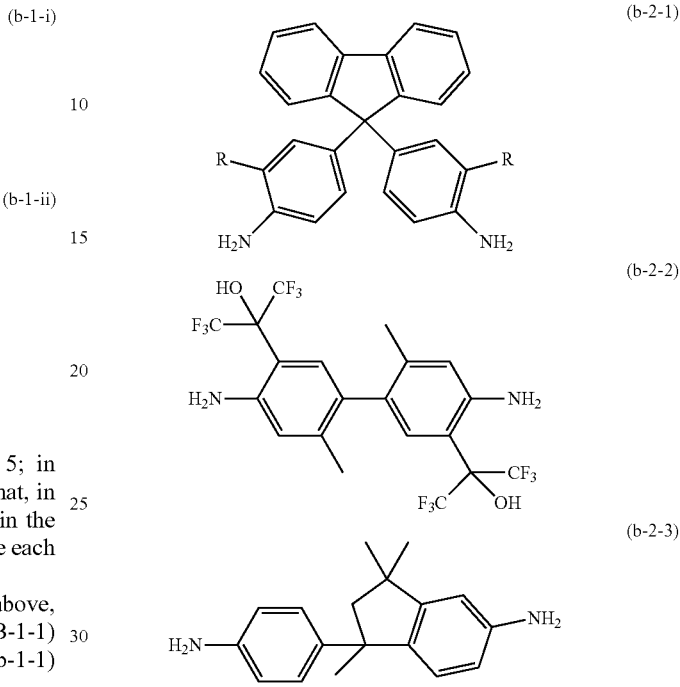

In Formula (b-2-1), R is each independently a hydrogen atom, a fluorine atom, or a methyl group.

<5> The asymmetric membrane described in any one of <1> to <4> above, where the crosslinking agent is a compound having not less than two oxazolyl groups in a molecule.

<6> The asymmetric membrane described in any one of <1> to <4> above, where the crosslinking agent is a compound having not less than two hydroxy groups in a molecule.

<7> The asymmetric membrane described in any one of <1> to <6> above, where the asymmetric membrane is in a hollow fiber form.

<8> The asymmetric membrane described in any one of <1> to <6> above, where the asymmetric membrane is in a film form.

<9> The asymmetric membrane described in any one of <1> to <8> above, where the asymmetric membrane is a gas separation membrane.

Advantageous Effects of Invention

The asymmetric membrane of an embodiment of the present invention achieves both excellent $CO_2$ permeability and excellent $CO_2$ selectivity in a compatible manner, achieves a high recovery rate of the $CO_2$ selectivity, and has a long product life.

DESCRIPTION OF EMBODIMENTS

Asymmetric Membrane

The asymmetric membrane of the present embodiment is an asymmetric membrane including a crosslinked polyimide resin, the crosslinked polyimide resin being formed by crosslinking a polyimide resin by a crosslinking agent;

the polyimide resin including a structural unit (A) derived from tetracarboxylic dianhydride and a structural unit (B) derived from diamine;

the structural unit (A) including a structural unit (A-1) derived from a compound represented by Formula (a-1) below;

the structural unit (B) including a structural unit (B-1) derived from Formula (b-1) below, and a proportion of the structural unit (B-1) per 100 mol % of the structural unit (B) being from 0.1 to 50 mol %; and the crosslinking agent being a compound having not less than two functional groups that bond with carboxy groups.

In the present embodiment, "asymmetric membrane" refers to a membrane having an asymmetrical structure including at least two layers, which are a porous layer having gas permeability and a dense layer having a gas separation function. The dense layer has a denseness to an extent that the permeation rate substantially differs based on the type of gas, and has a separation function based on the type of gas. On the other hand, a porous layer is a layer having porosity to an extent that exhibits substantially no gas separation function, and the pore diameter is not necessarily constant. The porous layer may be formed in an arrangement where the pores are arranged successively from large pores to small pores and continuously to the dense layer. The polyimide resin of the present embodiment is present at least in the dense layer of the asymmetric membrane.

The asymmetric membrane of the present embodiment includes a crosslinked polyimide resin formed by crosslinking a polyimide resin by a crosslinking agent. The polyimide resin and the crosslinking agent of the present embodiment are described below.

Polyimide Resin

The polyimide resin of the present embodiment includes a structural unit (A) derived from tetracarboxylic dianhydride and a structural unit (B) derived from diamine. The structural unit (A) includes a structural unit (A-1) derived from a compound represented by Formula (a-1) below, and the structural unit (B) includes a structural unit (B-1) derived from a compound represented by Formula (b-1) below.

[Chemical Formula 6]

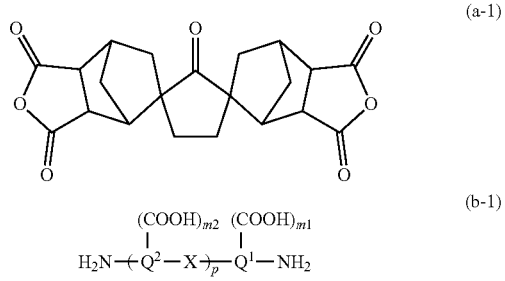

In Formula (b-1), $Q^1$ and $Q^2$ are each independently a group including an aromatic group, an aliphatic hydrocarbon group, and/or an alicyclic hydrocarbon group; X is a single bond, a substituted or unsubstituted alkylene group, a carbonyl group, an ether group, a group represented by Formula (b-1-i) below, or a group represented by Formula (b-1-ii) below; p is an integer from 0 to 2; m1 is an integer from 0 to 4; and m2 is an integer from 0 to 4. However, in the case where p is 0, m1 is an integer from 1 to 4.

[Chemical Formula 7]

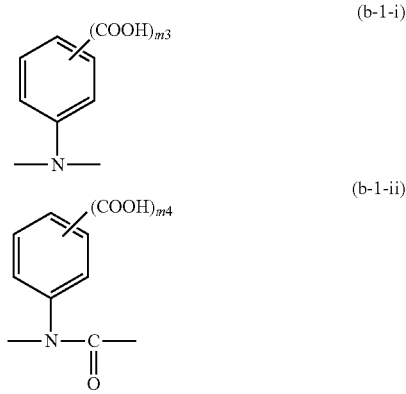

In Formula (b-1-i), m3 is an integer from 0 to 5; in Formula (b-1-ii), m4 is an integer from 0 to 5. Note that, in Formula (b-1), m1+m2+m3+m4 is 1 or greater; and in the case where p is 2, two X moieties and two m2 to m4 are each independently selected.

Structural Unit (A)

The structural unit (A) is a structural unit derived from tetracarboxylic dianhydride in the polyimide resin and includes a structural unit (A-1) derived from a compound represented by Formula (a-1) below.

[Chemical Formula 8]

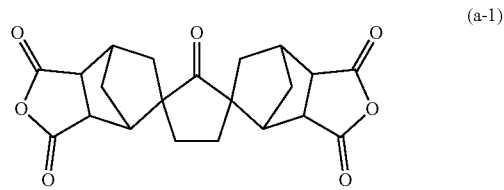

The compound represented by Formula (a-1) is norbornane-2-spiro-α-cyclopentanone-α'-spiro-2"-norbornane-5,5",6,6"-tetracarboxylic dianhydride (CpODA).

The structural unit (A) includes the structural unit (A-1), and thus an asymmetric membrane that achieves both excellent $CO_2$ permeability and excellent $CO_2$ selectivity in a compatible manner and that is useful as a gas separation membrane can be provided.

The proportion of the structural unit (A-1) in the structural unit (A) is preferably from 0.1 to 100 mol %. The proportion may be not less than 1 mol %, not less than 5 mol %, not less than 10 mol %, not less than 30 mol %, not less than 50 mol %, not less than 70 mol %, or not less than 90 mol %. Furthermore, the upper limit for the proportion of the structural unit (A-1) is not particularly limited and is 100 mol %. That is, the structural unit (A) may consist only of the structural unit (A-1).

The structural unit (A) may include another structural unit besides the structural unit (A-1). The tetracarboxylic dianhydride that provides such a structural unit is not particularly limited, and examples thereof include tetracarboxylic dianhydride having groups represented by Formulas (I-1) to (I-28) below. In Formulas (I-1) to (I-28), * represents a bonding location to a carboxy group, and four carboxy groups in a molecule are subjected to dehydration condensation to form two anhydrides. $X^1$ to $X^3$ each independently represent a single bond or a divalent linking group, L represents —CH=CH— or —CH$_2$—, and $R^1$ and $R^2$ each independently represent a hydrogen atom or a substituent.
[Chemical Formula 9]
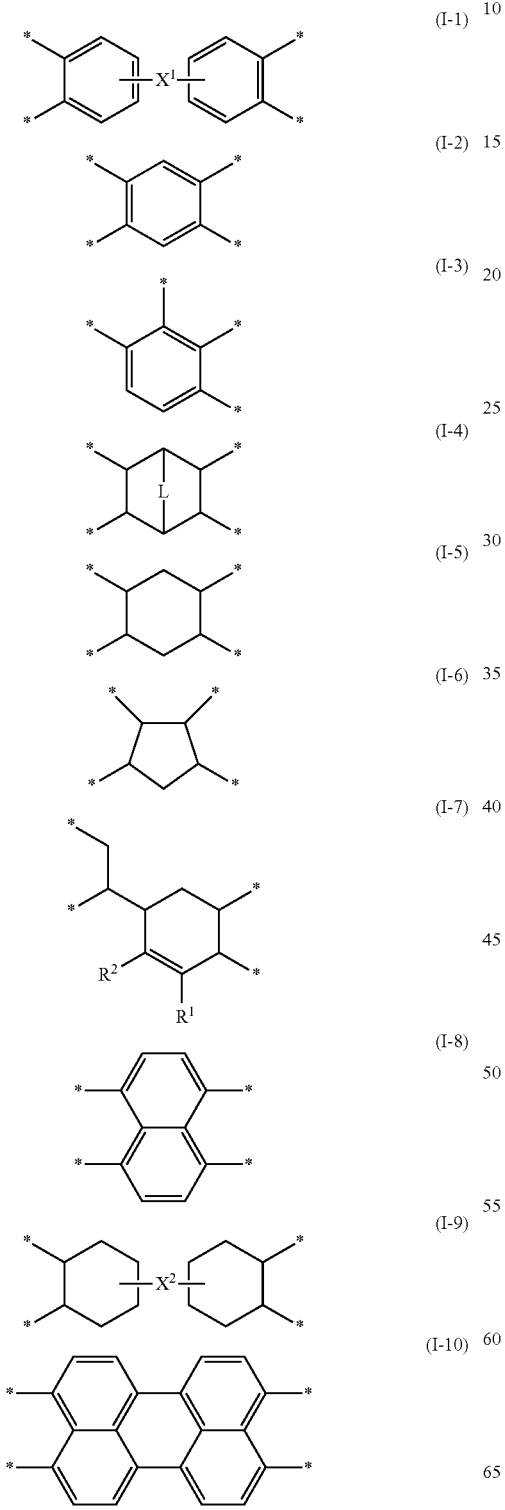
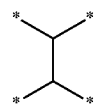
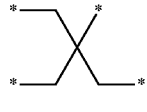
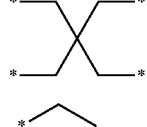
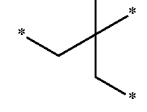
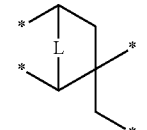
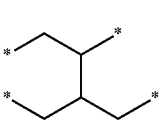
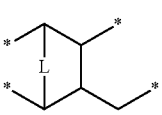
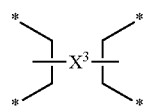
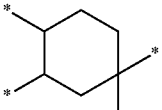
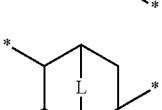
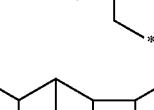
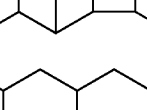
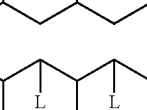

(I-24)
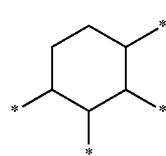

(I-25)
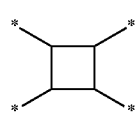

(I-26)
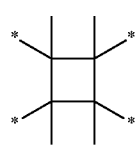

(I-27)
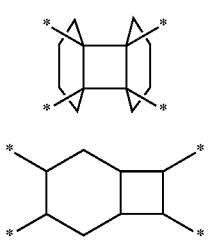

(I-28)

Specific examples of tetracarboxylic dianhydride that provides a structural unit other than the structural unit (A-1) include aromatic tetracarboxylic dianhydrides, such as pyromellitic dianhydride, 3,3',4,4'-biphenyltetracarboxylic dianhydride, 9,9'-bis(3,4-dicarboxyphenyl)fluorene dianhydride, 2,3,3',4'-biphenyltetracarboxylic dianhydride, 2,2-bis(3,4-dicarboxyphenyl)propane dianhydride, 2,2-bis(2,3-dicarboxyphenyl)propane dianhydride, 2,2-bis(3,4-dicarboxyphenyl)-1,1,1,3,3,3-hexafluoropropane dianhydride, 2,2-bis(2,3-dicarboxyphenyl)-1,1,1,3,3,3-hexafluoropropane dianhydride, bis(3,4-dicarboxyphenyl) sulfone dianhydride, bis(3,4-dicarboxyphenyl)ether dianhydride, bis(2,3-dicarboxyphenyl)ether dianhydride, 3,3',4,4'-benzophenonetetracarboxylic dianhydride, 2,2',3,3'-benzophenonetetracarboxylic dianhydride, 4,4-(p-phenylenedioxy)diphthalic dianhydride, and 4,4-(m-phenylenedioxy)diphthalic dianhydride; alicyclic tetracarboxylic dianhydrides (however, except compounds represented by Formula (a-1)), such as 1,2,4,5-cyclohexanetetracarboxylic dianhydride (HPMDA) and 1,2,3,4-cyclobutanetetracarboxylic dianhydride; and aliphatic tetracarboxylic dianhydrides, such as ethylenetetracarboxylic dianhydride and 1,2,3,4-butanetetracarboxylic dianhydride.

Note that, in the present specification, "aromatic tetracarboxylic dianhydride" refers to tetracarboxylic dianhydride including at least one aromatic ring, "alicyclic tetracarboxylic dianhydride" refers to tetracarboxylic dianhydride including at least one alicyclic ring but including no aromatic ring, and "aliphatic tetracarboxylic dianhydride" refers to tetracarboxylic dianhydride including no aromatic ring and no alicyclic ring.

The structural unit optionally included in the structural unit (A), other than the structural unit (A-1), may be one type or two or more types.

Structural unit (B) The structural unit (B) is a structural unit derived from diamine in the polyimide resin and includes a structural unit (B-1) derived from a compound represented by Formula (b-1) below.

(b-1)
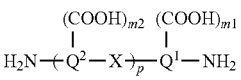

In Formula (b-1), $Q^1$ and $Q^2$ are each independently a group including an aromatic group, an aliphatic hydrocarbon group, and/or an alicyclic hydrocarbon group; X is a single bond, a substituted or unsubstituted alkylene group, a carbonyl group, an ether group, a group represented by Formula (b-1-i) below, or a group represented by Formula (b-1-ii) below; p is an integer from 0 to 2; m1 is an integer from 0 to 4; and m2 is an integer from 0 to 4. However, in the case where p is 0, m1 is an integer from 1 to 4.

[Chemical Formula 11]

(b-1-i)
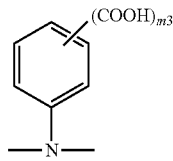

(b-1-ii)
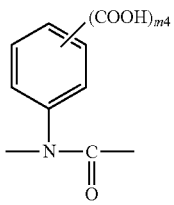

In Formula (b-1-i), m3 is an integer from 0 to 5; in Formula (b-1-ii), m4 is an integer from 0 to 5. Note that, in Formula (b-1), m1+m2+m3+m4 is 1 or greater; and in the case where p is 2, two X moieties and two m2 to m4 are independently selected.

In Formula (b-1), $Q^1$ and $Q^2$ are each independently a group including an aromatic group, an aliphatic hydrocarbon group, and/or an alicyclic hydrocarbon group. These groups may each have a substituent group having a heteroatom and/or a halogen atom.

Examples of the aromatic group include a benzene ring, and a naphthalene ring. The aliphatic hydrocarbon group may be linear or branched. Furthermore, the aliphatic hydrocarbon group may be saturated or unsaturated. The number of carbons in the aliphatic hydrocarbon group is preferably from 1 to 12, more preferably from 2 to 10, and even more preferably from 3 to 8. Examples of the alicyclic hydrocarbon group include a cyclohexane ring, and a cyclopentane ring.

$Q^1$ and $Q^2$ may be each independently an aromatic group, an aliphatic hydrocarbon group, or an alicyclic hydrocarbon group, or may be a combination of two or more types selected from the group consisting of aromatic groups, aliphatic hydrocarbon groups, and alicyclic hydrocarbon groups. For example, $Q^1$ and $Q^2$ may be a group including an aromatic group and an aliphatic hydrocarbon group.

The structural unit (B-1) is preferably a structural unit (B-1-1) derived from a compound represented by Formula (b-1-1) below. The compound represented by Formula (b-1-1) is a compound in which $Q^1$ and $Q^2$ in Formula (b-1) are benzene rings.

[Chemical Formula 12]

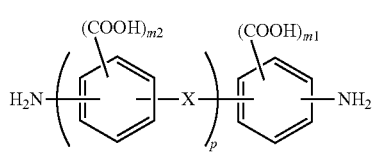

(b-1-1)

In Formula (b-1-1), X, p, m1, and m2 are the same as X, p, m1, and m2 in Formula (b-1) above.

Specific examples of the compound represented by Formula (b-1) include compounds represented by Formulas (b-1-11) to (b-1-17) below.

[Chemical Formula 13]

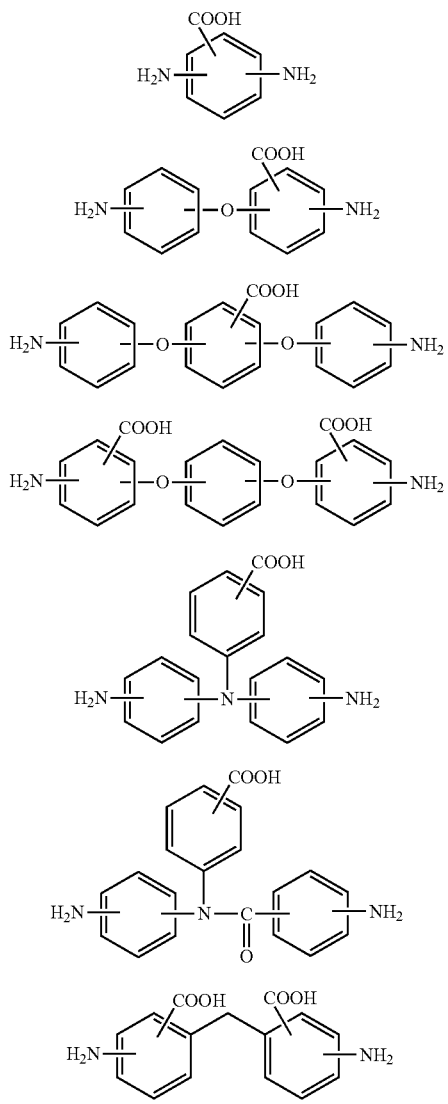

Furthermore, other specific examples of the compound represented by Formula (b-1) include 2,4,6-trimethyl-3,5-dinitrobenzoic acid, diaminonaphthalene carboxylic acid, lysine, α-aminophenylalanine, 2-amino leucine, 2,3-diaminobutanoic acid, and 3,4-diaminocyclohexanecarboxylic acid.

Among the compounds described above, the compounds represented by Formula (b-1-11) is preferable, and the compound represented by Formula (b-1-111) below, i.e. 3,5-diaminobenzoic acid (3,5-DABA), is more preferable.

[Chemical Formula 14]

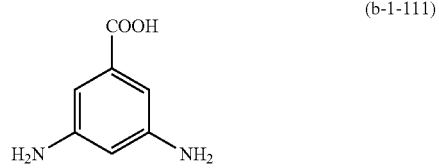

(b-1-111)

The structural unit (B-1) is a structural unit that provides a carboxy group to the polyimide resin. The polyimide resin has a carboxy group, and thus the polyimide resin can be crosslinked through a crosslinking agent described below, and thus a crosslinked polyimide resin can be formed. Such a crosslinked polyimide resin is included in an asymmetric membrane, and thus the asymmetric membrane that is less likely to be plasticized even when used in a high pressure and that has high recovery rate of $CO_2$ selectivity can be provided.

Therefore, the structural unit (B) includes the structural unit (B-1), and an asymmetric membrane that has high recovery rate of $CO_2$ selectivity can be provided.

The proportion of the structural unit (B-1) in the structural unit (B) is from 0.1 to 50 mol %. The proportion of the structural unit (B-1) of 50 mol % or less in the structural unit (B) can appropriately crosslink polyimide resins through a crosslinking agent described below and can provide an asymmetric membrane that has high recovery rate of $CO_2$ selectivity while excellent $CO_2$ permeability and excellent $CO_2$ selectivity are maintained.

The proportion of the structural unit (B-1) in the structural unit (B) is preferably from 1 to 50 mol %, more preferably from 5 to 40 mol %, even more preferably from 8 to 30 mol %, and yet even more preferably from 10 to 25 mol %.

Examples of the structural unit besides the structural unit (B-1) include structural units derived from alicyclic diamine, structural units derived from aliphatic diamine, and structural units derived from aromatic diamine. The structural unit besides the structural unit (B-1) is preferably a structural unit derived from aromatic diamine.

Note that, in the present specification, "aromatic diamine" refers to diamine including at least one aromatic ring, "alicyclic diamine" refers to diamine including at least one alicyclic ring but including no aromatic ring, and "aliphatic diamine" refers to diamine including no aromatic ring and no alicyclic ring.

The structural unit optionally included in the structural unit (B), besides the structural unit (B-1), may be one type or two or more types.

The alicyclic diamine is not particularly limited, and examples thereof include 1,3-bis(aminomethyl)cyclohexane, and 1,4-bis(aminomethyl)cyclohexane.

The aliphatic diamine is not particularly limited, and examples thereof include ethylenediamine, and hexamethylenediamine.

The aromatic diamine is not particularly limited, and examples thereof include phenylenediamine and derivatives thereof, diaminobiphenyl compounds and derivatives thereof, diaminodiphenyl compounds and derivatives thereof, diaminotriphenyl compounds and derivatives thereof, diaminonaphthalene and derivatives thereof, aminophenyl aminoindane and derivatives thereof, diaminotetraphenyl compounds and derivatives thereof, diaminohexaphenyl compounds and derivatives thereof, and cardo fluorene diamine derivatives.

Examples of phenylenediamine include m-phenylenediamine, and p-phenylenediamine. Examples of phenylenediamine derivative include diamines to which an alkyl group such as a methyl group or an ethyl group is bonded, such as 2,4-diaminotoluene and 2,4-triphenylenediamine.

The diaminobiphenyl compound is a compound in which two aminophenyl groups are bonded at respective phenyl groups, and examples thereof include 4,4'-diaminobiphenyl, 4,4'-diamino-2,2'-bis(trifluoromethyl)biphenyl, and 5,5'-(1,1,1,3,3,3-hexafluoro-2-hydroxyisopropyl)-2,2'-dimethylbiphenyl-4,4'-diamine (compound represented by Formula (b-2-2) below).

The diaminodiphenyl compound is a compound in which two aminophenyl groups are bonded at respective phenyl groups through another group. Examples of such another group include ether bonds, sulfonyl bonds, thioether bonds, bonds by alkylene or derivative groups thereof, imino bonds, azo bonds, phosphine oxide bonds, amide bonds, and ureylene bonds. Examples of the alkylene bond include alkylene bonds having from approximately 1 to 6 carbons, and the derivative group thereof is a group in which at least one hydrogen atom of the alkylene group is substituted with a halogen atom and the like. Examples of the diaminodiphenyl compound include 3,3'-diaminodiphenyl ether, 3,4'-diaminodiphenyl ether, 4,4'-diaminodiphenyl ether, 3,3'-diaminodiphenyl sulfone, 3,4'-diaminodiphenyl sulfone, 4,4'-diaminodiphenyl sulfone, 3,3'-diaminodiphenyl methane, 3,4'-diaminodiphenyl methane, 4,4'-diaminodiphenyl methane, 4,4'-diaminodiphenyl sulfide, 3,3'-diaminodiphenyl ketone, 3,4'-diaminodiphenyl ketone, 2,2-bis(p-aminophenyl)propane, 2,2'-bis(p-aminophenyl)hexafluoropropane, 4-methyl-2,4-bis(p-aminophenyl)-1-pentene, 4-methyl-2,4-bis(p-aminophenyl)-2-pentene, iminodianiline, 4-methyl-2,4-bis(p-aminophenyl)pentane, bis(p-aminophenyl)phosphine oxide, 4,4'-diaminoazobenzene, 4,4'-diamino diphenyl urea, 4,4'-diamino diphenyl amide, 1,4-bis(4-aminophenoxy)benzene, 1,3-bis(4-aminophenoxy)benzene, 1,3-bis(3-aminophenoxy)benzene, 4,4'-bis(4-aminophenoxy)biphenyl, bis[4-(4-aminophenoxy)phenyl] sulfone, bis[4-(3-aminophenoxy)phenyl]sulfone, 2,2-bis[4-(4-aminophenoxy)phenyl]propane, and 2,2-bis[4-(4-aminophenoxy)phenyl]hexafluoropropane.

The diaminotriphenyl compound is a compound in which two aminophenyl groups and one phenylene group are all bonded through another group, and examples of such another group include the same groups as those exemplified for the diaminodiphenyl compound. Examples of the diaminotriphenyl compound include 1,3-bis(m-aminophenoxy)benzene, 1,3-bis(p-aminophenoxy)benzene, and 1,4-bis(p-aminophenoxy)benzene.

Examples of the diaminonaphthalene include 1,5-diaminonaphthalene and 2,6-diaminonaphthalene.

Examples of the aminophenylaminoindane include 5-amino-1-(p-aminophenyl)-1,3,3-trimethylindane (compound represented by Formula (b-2-3) below) and 6-amino-1-(p-aminophenyl)-1,3,3-trimethylindane.

Examples of the diaminotetraphenyl compound include 4,4'-bis(p-aminophenoxy)biphenyl, 2,2'-bis[p-(p'-aminophenoxy)phenyl]propane, 2,2'-bis[p-(p'-aminophenoxy)biphenyl]propane, and 2,2'-bis[p-(m-aminophenoxy)phenyl]benzophenone.

Examples of the cardo fluorene diamine derivative include 9,9-bis(4-aminophenyl)fluorene (compound represented by Formula (b-2-1) below).

Note that the aromatic diamine may be a compound in which a hydrogen atom of the diamine described above is substituted with at least one type of substituent selected from the group consisting of a halogen atom, a methyl group, a methoxy group, a cyano group, a phenyl group, and the like. Furthermore, one type of the aromatic diamine may be used alone, or a combination of two or more types of the aromatic diamines may be used.

From the perspective of excellent $CO_2$ permeability and $CO_2$ selectivity, a structural unit (B-2), which is at least one selected from the group consisting of a structural unit (B-2-1) derived from a compound represented by Formula (b-2-1) below, a structural unit (B-2-2) derived from a compound represented by Formula (b-2-2) below, and a structural unit (B-2-3) derived from a compound represented by Formula (b-2-3) below, is preferable as a structural unit other than the structural unit (B-1).

[Chemical Formula 15]

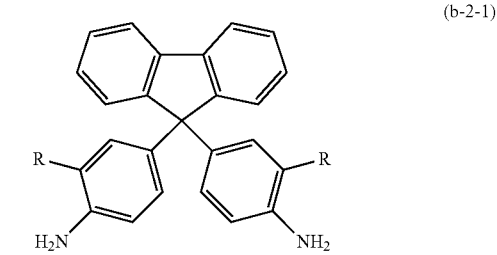

(b-2-1)

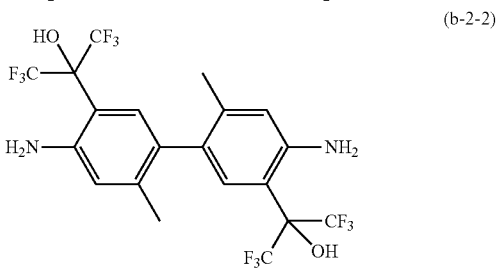

(b-2-2)

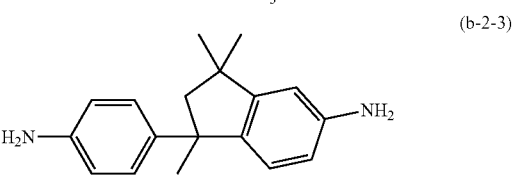

(b-2-3)

(In Formula (b-2-1), R is each independently a hydrogen atom, a fluorine atom, or a methyl group.)

In Formula (b-2-1), R is each independently a hydrogen atom, a fluorine atom, or a methyl group, and is preferably a hydrogen atom. Examples of the compound represented by Formula (b-2-1) include 9,9-bis(4-aminophenyl)fluorene (BAFL), 9,9-bis(3-fluoro-4-aminophenyl)fluorene, and 9,9-bis(3-methyl-4-aminophenyl)fluorene, and 9,9-bis(4-aminophenyl)fluorene is preferable.

The compound represented by Formula (b-2-2) is 5,5'-(1,1,1,3,3,3-hexafluoro-2-hydroxyisopropyl)-2,2'-dimethylbiphenyl-4,4'-diamine (HFA-mTB).

The compound represented by Formula (b-2-3) is 5-amino-1-(p-aminophenyl)-1,3,3-trimethylindane (TMDA).

The proportion of the structural unit (B-2) in the structural unit (B) is preferably from 50 to 99.9 mol %, more preferably from 50 to 99 mol %, even more preferably from 60 to 95 mol %, yet even more preferably from 70 to 92 mol %, and yet even more preferably from 75 to 90 mol %.

In the present embodiment, the number average molecular weight of the polyimide resin is preferably from 5000 to 100000 from the perspective of mechanical strength of the polyimide film that is obtained. Note that the number average molecular weight of the polyimide resin can be determined, for example, in terms of standard polymethyl methacrylate (PMMA) through gel filtration chromatography measurement.

Method for Producing Polyimide Resin

The polyimide resin can be produced using the tetracarboxylic acid component and diamine component, and the production method thereof is not particularly limited. Examples thereof include known methods such as (i) a solution polymerization method, (ii) a method of obtaining a polyamic acid solution, forming a film, and performing imidization, (iii) a method of obtaining a salt or oligomer of a carboxylic acid component and a diamine component, and then performing solid phase polymerization, and (iv) a method that uses a tetracarboxylic dianhydride and diisocyanate as raw materials, and the respective methods can be used in combination. Moreover, when the reaction is performed, known catalysts such as acids, tertiary amines, and anhydrides can be used.

In the present embodiment, the polyimide resin is ordinarily produced as an organic solvent solution. The organic solvent is not particularly limited, and examples thereof include N-methyl-2-pyrrolidone, N,N-dimethylacetamide, N,N-diethylacetamide, N,N-dimethylformamide, N,N-diethylformamide, N-methylcaprolactam, hexamethylphosphoramide, tetramethylenesulfone, dimethyl sulfoxide, m-cresol, phenol, p-chlorophenol, 2-chloro-4-hydroxytoluene, diglyme, triglyme, tetraglyme, dioxane, γ-butyrolactone, dioxolane, cyclohexanone, and cyclopentanone. These may be used alone, or two or more types may be used in combination. From the perspective of the performance of a polyimide varnish including a polyimide and a solvent, preferably, N-methyl-2-pyrrolidone (NMP), N,N-dimethylacetamide (DMAC), and γ-butyrolactone (GBL) are used alone or in combination.

In addition, for a case of production using solution polymerization, poor solvents such as hexane, heptane, benzene, toluene, xylene, chlorobenzene, and o-dichlorobenzene can be used in combination with the organic solvent at an extent that a polymer is not precipitated.

The organic solvent solution of the polyimide resin can, for example, be produced by the methods (1) to (3) below.

(1) Add a tetracarboxylic acid component to an organic solvent solution of a diamine component, or add the diamine component to an organic solvent solution of the tetracarboxylic acid component, and maintain at a temperature of preferably 80° C. or lower, and particularly at a temperature near room temperature or lower for 0.5 to 3 hours. Add an azeotropic dehydration solvent such as toluene or xylene to the polyamic acid solution of the reaction intermediate that was obtained, perform a dehydration reaction while azeotropically removing, to outside the reaction system, the water that is produced, and obtain an organic solvent solution of a polyimide resin.

(2) Add a dehydrating agent such as acetic anhydride to the polyamic acid solution of the reaction intermediate that was obtained in (1) above, and perform imidization, and subsequently add a solvent such as methanol which has poor dissolving capacity with respect to polyimides to precipitate the polyimide. Filter, wash, and dry the precipitate to separate as a solid, and subsequently dissolve the precipitate in an organic solvent to obtain an organic solvent solution of the polyimide resin.

(3) In (1) above, prepare a polyamic acid solution using a high boiling point solvent such as cresol, maintain as is for 3 to 12 hours at a temperature from 150 to 220° C. to cause polyimidization, and subsequently add a solvent such as methanol which has poor dissolving capacity with respect to polyimides to precipitate the polyimide. Filter, wash, and dry the precipitate to thereby separate as a solid, and subsequently dissolve the precipitate in an organic solvent such as N,N-dimethylacetamide to obtain an organic solvent solution of the polyimide resin.

In a case where the polyimide resin is produced through solution polymerization in the present embodiment, a tertiary amine compound is preferably used as the catalyst. Examples of the tertiary amine compound include trimethylamine, triethylamine (TEA), tripropyl amine, tributylamine, triethanolamine, N,N-diemethylethanolamine, N,N-diethylethanolamine, triethylene diamine, N-methylpyrrolidine, N-ethylpyrrolidine, N-methylpiperidine, N-ethylpiperidine, imidazole, pyridine, quinoline, and isoquinoline.

Moreover, the concentration of the polyimide resin solution is preferably from 1 to 50 mass %, and more preferably from 10 to 40 mass %.

A surfactant such as a fluorine-based surfactant, and a polysiloxane-based surfactant can also be added to the organic solvent solution of the polyimide resin. A film with good surface smoothness is more easily obtained by adding a surfactant.

In the present embodiment, the ratio of the charging amounts of the tetracarboxylic acid component and the diamine component that are used to produce the polyimide resin is preferably such that the amount of the diamine component is from 0.9 to 1.1 moles per 1 mole of the tetracarboxylic acid component.

In addition, in the production of the polyimide resin of the present embodiment, a terminal capping agent may be used in addition to the tetracarboxylic acid component and diamine component. As the terminal capping agent, monoamines or dicarboxylic acids are preferable. The charging amount of the terminal capping agent that is introduced is preferably from 0.0001 to 0.1 moles, and particularly preferably from 0.001 to 0.06 moles relative to 1 mole of the tetracarboxylic acid component. Recommended examples of monoamine terminal capping agents include methylamine, ethylamine, propylamine, butylamine, benzylamine, 4-methylbenzylamine, 4-ethylbenzylamine, 4-dodecylbenzylamine, 3-methylbenzylamine, 3-ethylbenzylamine, aniline, 3-methylaniline, and 4-methylaniline. Of these, benzylamine and aniline can be suitably used. As the dicarboxylic acid terminal capping agent, dicarboxylic acids are preferable, and a portion thereof may be subjected to ring closure. Recommended examples thereof include phthalic acid, phthalic anhydride, 4-chlorophthalic acid, tetrafluorophthalic acid, 2,3-benzophenone dicarboxylic acid, 3,4-benzophenone dicarboxylic acid, cyclohexane-1,2-dicarboxylic acid, cyclopentane-1,2-dicarboxylic acid, and 4-cyclohexene-1,2-dicarboxylic acid. Of these, phthalic acid and phthalic anhydride can be suitably used.

The organic solvent solution of the polyimide resin of the present embodiment may include other components such as known antioxidants, thermal stabilizers, ultraviolet absorbers, and fillers.

In the present embodiment, the polyimide resin excels in solubility in a solvent, and therefore is soluble in a wide range of ordinary organic solvents. Accordingly, the present invention has a merit of excelling in processability when using a polyimide resin to form a membrane of a film shape or the like.

Crosslinking Agent

In the present embodiment, the crosslinking agent is a compound including two or more functional groups that bond to a carboxy group. The crosslinking agent is not particularly limited as long as the crosslinking agent can crosslink the polyimide resin, and known materials can be used. Examples of the crosslinking agent include a polyol compound, an epoxy compound, a melamine compound, an oxazoline compound, an isocyanate-based compound, an amine-based compound, a carbodiimide-based compound, a silane coupling compound, a hydrazide compound, and an aziridine compound. As the crosslinking agent, for example, ethylene glycol, propylene glycol (1,2-propanediol), trimethylene glycol (1,3-propanediol, PDO), 1,3-bis(4,5-dihydro-2-oxazolyl)benzene (1,3-PBO), and ethylenediamine can be used.

Moreover, the crosslinking agent that can be used in the present embodiment is preferably a compound including two or more oxazolyl groups per molecule (polyfunctional oxazoline compound). The oxazolyl group exhibits reactivity with a carboxy group, and when a carboxy group and an oxazolyl group react, an amide ester bond is formed as illustrated below. This reaction is particularly facilitated when heated to 80° C. or higher.

[Chemical Formula 16]

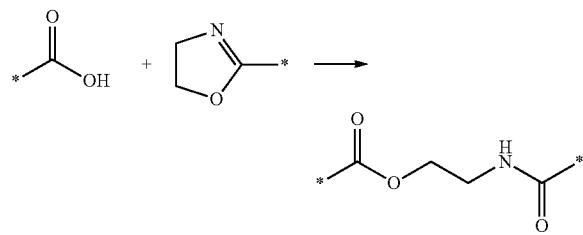

The polyimide resin according to the present embodiment includes a carboxy group, and therefore when a composition including the polyimide resin according to the present embodiment and a crosslinking agent is heated, the polyimide resins are crosslinked through the crosslinking agent, and a crosslinked polyimide resin is formed. An asymmetric membrane with a high $CO_2$ selective recovery rate can be provided by appropriately performing crosslinking among the polyimide resins through the crosslinking agent. Note that a reaction between the oxazolyl group and the carboxy group does not progress for the most part at room temperature, and therefore the composition including the polyimide resin according to the present embodiment and the crosslinking agent excels in storage stability.

Specific examples of the polyfunctional oxazoline compound include 1,3-bis(4,5-dihydro-2-oxazolyl)benzene, 1,4-bis(4,5-dihydro-2-oxazolyl)benzene, 2,2'-bis(2-oxazoline), "K-2010E", "K-2020E", and "K-2030E" available from Nippon Shokubai Co., Ltd., 2,6-bis(4-isopropyl-2-oxazolin-2-yl)pyridine, 2,6-bis(4-phenyl-2-oxazolin-2-yl)pyridine, 2,2'-isopropylidene bis(4-phenyl-2-oxazoline), and 2,2'-isopropylidene bis(4-tert-butyl-2-oxazoline).

As the polyfunctional oxazoline compound, a compound including a benzene ring to which at least two oxazolyl groups are bonded is preferable, and 1,3-bis(4,5-dihydro-2-oxazolyl)benzene is more preferable.

The polyfunctional oxazoline compound may be used alone, or two or more types may be used in combination.

In a case where a polyfunctional oxazoline compound is used as the crosslinking agent, the polyimide resin and the crosslinking agent are preferably blended at a ratio such that the molar ratio of the oxazolyl group in the crosslinking agent to the carboxy group in the polyimide resin (oxazolyl group/carboxy group) is in a range from 1/4 to 1/0.5. The molar ratio is more preferably from 1/4 to 1/1, and even more preferably from 1/2 to 1/1.

Note that the molar ratio means the molar ratio between the oxazolyl groups included in the crosslinking agent, and the carboxy groups included in the compound that provides the structural unit (B-1) used in the production of the polyimide resin, and the molar ratio thereof is calculated based on the addition amount of the crosslinking agent and the addition amount of the compound that provides the structural unit (B-1).

Moreover, other crosslinking agents that can be used in the present embodiment are preferably compounds (polyol compounds) including two or more hydroxy groups per molecule. The hydroxy group exhibits reactivity with the carboxy group, and when a carboxy group and a hydroxy group react, an ester bond is formed. This reaction is particularly facilitated when heated to 150° C. or higher.

In a case where a polyol compound is used as the crosslinking agent, the polyimide resin and the crosslinking agent are preferably blended at a ratio such that the molar ratio of the hydroxy group in the crosslinking agent and the carboxy group in the polyimide resin (hydroxy group/carboxy group) is in a range from 1/4 to 1/0.5. The molar ratio is more preferably from 1/4 to 1/1, and even more preferably from 1/2 to 1/1.

Note that the above-described molar ratio means the molar ratio between the hydroxy groups included in the crosslinking agent, and the carboxy groups included in the compound that provides the structural unit (B-1) used in the production of the polyimide resin, and the molar ratio thereof is calculated based on the addition amount of the crosslinking agent and the addition amount of the compound that provides the structural unit (B-1).

The asymmetric membrane of the present embodiment includes at least two layers including a gas permeable porous layer, and a dense layer having a gas separation function. In the asymmetric membrane of the present embodiment, the crosslinked polyimide resin is preferably included in at least the dense layer. The crosslinked polyimide resin may also be included in the porous layer.

The shape of the asymmetric membrane of the present embodiment is not particularly limited, but is preferably a hollow fiber form or a film form.

The asymmetric membrane of the present embodiment achieves both excellent $CO_2$ permeability and $CO_2$ selectivity.

As the $CO_2$ permeability, the value of the permeability coefficient $PCO_2$ of carbon dioxide is preferably 10 Barrer or greater, more preferably 15 Barrer or greater, even more preferably 18 Barrer or greater, and yet even more preferably 20 Barrer or greater. The unit of the permeability coefficient is "Barrer", and 1 Barrer is $10^{-10}$ cm$^3$ (STP)·cm/cm$^2$·sec·cmHg.

As the CO$_2$ selectivity, a degree of separation of carbon dioxide to methane, namely $\alpha P_{CO2}/P_{CH4}$, is preferably 27 or greater, more preferably 30 or greater, even more preferably 33 or greater, yet even more preferably 36 or greater, and yet even more preferably 40 or greater.

CO$_2$ permeability and CO$_2$ selectivity are measured by a method described in the examples described below.

The asymmetric membrane of the present embodiment also exhibits a high CO$_2$ selective recovery rate.

The CO$_2$ selective recovery rate is determined by exposing the asymmetric membrane to 4 MPa of mixed gas for 2 weeks, removing the asymmetric membrane from the mixed gas and placing in the atmosphere for 1 month, subsequently measuring the $\alpha P_{CO2}/P_{CH4}$, and calculating the CO$_2$ selective recovery rate on the basis of the $\alpha P_{CO2}/P_{CH4}$ before exposure to the mixed gas. The CO$_2$ selective recovery rate is measured specifically by a method described in the examples described below.

The CO$_2$ selective recovery rate is preferably 90% or greater, more preferably 92% or greater, and even more preferably 95% or greater.

Method for Producing Asymmetric Membrane

The asymmetric membrane of the present embodiment can be obtained, for example, by using a polyimide resin film obtained from the polyimide resin as the dense layer, and then laminating a porous layer onto this dense layer. The polyimide resin film can be obtained, for example, by using the polyamic acid (polyimide precursor) obtained from the tetracarboxylic acid component and the diamine component, or an organic solvent solution of polyimide that is soluble with an organic solvent and the like as a dope solution for film formation, forming a thin film of the dope solution, and forming the thin film into a film form or a hollow fiber form using a dry film forming method of forming a film through mainly a drying step in which the solvent is removed from the thin film of the dope solution, and the thin film is solidified, or by a wet film forming method in which the thin film of the dope solution is made to contact a coagulation liquid and coagulate and solidify, and thereby polyimide resin films of various shapes can be obtained. Moreover, in the production of the polyimide resin film, a material having a smooth surface (for example, a glass plate, a flat, smooth copper plate, a metal roll or belt with a smooth surface and the like) is used as a substrate, the film is formed, and after a homogeneous film is formed, the film is peeled from the substrate, and thereby the homogeneous film is obtained in a very thin film shape.

The polyimide resin film constituting the asymmetric membrane of the present embodiment includes crosslinked polyimide resins obtained by crosslinking the polyimide resin using the crosslinking agent. Namely, the polyimide resin film constituting the asymmetric membrane of the present embodiment includes crosslinked polyimide resins, which are crosslinked products of the polyimide resins, crosslinked through the crosslinking agent.

The method for producing the polyimide resin film is not particularly limited as long as the method includes crosslinking at a temperature at which a crosslinking reaction between the polyimide resin and the crosslinking agent advances (preferably 80° C. or higher, more preferably 100° C. or higher, and even more preferably 150° C. or higher). For example, a method of coating an organic solvent solution including the polyimide resin and the crosslinking agent onto a smooth support body such as a glass plate, a metal plate, or plastic, or forming the organic solvent solution into a film, and then subsequently heating the film can be used. Through this heat treatment, an organic solvent such as a reaction solvent and a dilution solvent included in the solution can be removed while advancing the crosslinking reaction between the polyimide resin and the crosslinking agent in the solution. The surface of the support body may be coated in advance with a mold release agent as necessary.

The following method is preferable as the heat treatment. Namely, preferably, the organic solvent is evaporated at a temperature from 60 to 150° C. to form a self-supporting film, after which the self-supporting film is peeled from the support body, an end part of the self-supporting film is fixed, the film was dried at a temperature at or above the boiling point of the organic solvent that was used, and thereby a polyimide resin film is produced. Moreover, drying in a nitrogen atmosphere is preferable. The pressure of the drying atmosphere may be any of a depressurized state, ordinary pressure, or a pressurized state. The heating temperature when drying the self-supporting film to produce the polyimide resin film is not particularly limited, but is preferably from 250 to 400° C.

The thickness of the polyimide resin film can be selected, as appropriate, according to the application and the like, but is preferably in a range from 1 to 250 μm, more preferably from 5 to 100 μm, and even more preferably from 10 to 80 μm. When the thickness is from 1 to 250 μm, practical use as a self-supporting film becomes possible. The thickness of the polyimide resin film can be easily controlled by adjusting the solid content concentration and viscosity of the polyimide varnish.

The asymmetric membrane can be produced, for example, by laminating or bonding the polyimide resin film as the dense layer (X) and another porous film. Furthermore, using the porous film as a substrate in the method for producing the polyimide resin film can provide an asymmetric membrane for which the polyimide resin film is integrally formed on a surface of the porous film. Herein, the porous film is not particularly limited, and examples thereof include gas permeable films such as a nanofiltration membrane, an ultrafiltration membrane, a microfiltration membrane, woven fabric, and nonwoven fabric. As the nonwoven fabric, fibers made from polyester, polypropylene, polyacrylonitrile, polyethylene, and polyamide and the like can be used alone, or a plurality can be used in combination. The nonwoven fabric can be produced, for example, by forming main fibers and binder fibers dispersed uniformly in water into a sheet using, a cylinder sheet forming machine, a Fourdrinier machine or the like, and then drying the sheet with a drier. In addition, for the purpose of removing nap and improving mechanical properties and the like, the nonwoven fabric is preferably held between two rolls and pressurized and heated.

The asymmetric membrane can also be produced by a method in which a film forming stock solution obtained by dissolving a polyimide in a suitable solvent is flow cast or coated as is onto a smooth glass plate, some of the solvent is evaporated for a certain amount of time, after which the resultant is immersed in a non-solvent, and the solvent is removed. In addition, a hollow fiber membrane can also be produced by simultaneously extruding, into a coagulation liquid, the film forming stock solution from an annular port of a hollow fiber spinning nozzle having a double tube structure and a non-solvent from a circular port of the hollow fiber spinning nozzle. After the asymmetric membrane formed by such a wet method has dried, it can be used as a gas separation membrane. The drying method may be an ordinary method, and for example, after being air-dried at room temperature, vacuum drying or heat drying may be performed. The obtained polyimide film has an asymmetric structure including a dense layer and a porous layer that supports the dense layer and is made from the same polyimide.

The asymmetric membrane of the present embodiment includes a polyimide resin that excels in solubility in a solvent, and therefore the asymmetric membrane excels in processability, and exhibits both excellent $CO_2$ permeability and $CO_2$ selectivity. Furthermore, the $CO_2$ selective recovery rate is high, and the product life span is long.

The asymmetric membrane of the present embodiment can be used in, the oxygen enrichment, and nitrogen enrichment of air, the collection or purification of helium from helium that has been used and into which welding gas and the like have been mixed, the concentration of helium in natural gas, the collection of hydrogen from ammonia purge gas, the adjustment of the molar ratio of carbon monoxide to hydrogen in synthesis gas, the collection of hydrogen from purge gas in a hydrodesulfurization plant, separation or collection of carbon dioxide gas from a hydrocarbon during the crude oil recovering, separation or removal of carbon dioxide gas within natural gas, and separation or collection of methane from biogas generated by decomposition through anaerobic microorganisms, and the asymmetric membrane of the present embodiment is particularly useful as a gas separation membrane for exhaust gas separation treatment and industrial gas. The asymmetric membrane of the present embodiment is not only suited for the separation of various liquids, gases, and vapors such as the desalination of water through reverse osmosis, non-aqueous liquid separation such as deep desulfurization of gasoline and diesel fuel, ethanol/water separation, pervaporation dehydration of aqueous/organic mixtures, separation of $CO_2/CH_4$, $CO_2/N_2$, $H_2/CH_4$, $O_2/N_2$, $H_2S/CH_4$, olefin/paraffin, and iso/normal paraffin, and the separation of other light gas mixtures, but can also be used in other applications such as catalytic reactions and fuel cell applications.

EXAMPLES

The present invention is described more specifically below through examples. However, the present invention is not limited in any way by these examples.

The tetracarboxylic acid component, diamine component, and crosslinking agent used in the examples and comparative examples, and the abbreviations thereof are as follows.
Tetracarboxylic Acid Component
  CpODA:
norbornane-2-spiro-L-cyclopentanone-α'-spiro-2"-norbornane-5,5",6,6"-tetracarboxylic dianhydride (available from JX Energy Corporation; compound represented by Formula (a-1))
  HPMDA: 1,2,4,5-cyclohexane tetracarboxylic dianhydride (available from Mitsubishi Gas Chemical Co., Inc.)
Diamine Component
  3,5-DABA: 3,5-diaminobenzoic acid (available from Nipponjunryo Chemicals KK; compound represented by Formula (b-111))
  BAFL: 9,9-bis(4-aminophenyl)fluorene (available from Taoka Chemical Co., Ltd.; compound represented by Formula (b-2-1))
  HFA-mTB:
5,5'-(1,1,1,3,3,3-hexafluoro-2-hydroxyisopropyl)-2,2'-dimethylbiphenyl-4,4'-diamine (available from Central Glass Co., Ltd.; compound represented by Formula (b-2-2))

TMDA: 5-amino-1-(p-aminophenyl)-1,3,3-trimethylindane (available from Nipponjunryo Chemicals KK; compound represented by Formula (b-2-3))
Crosslinking Agent
  1,3-PBO: 1,3-bis(4,5-dihydro-2-oxazolyl)benzene (available from Mikuni Pharmaceutical Industrial Co., Ltd.)
  PDO: 1,3-propanediol (available from DαPont)

Example 1

A 1 L five-neck round-bottom flask provided with a semilunar-shaped stirring blade made of stainless steel, a nitrogen introduction tube, a Dean-Stark apparatus equipped with a cooling tube, a temperature gage, and an end cap made of glass was filled with 31.361 g (0.090 moles) of BAFL, 1.522 g (0.010 moles) of 3,5-DABA, and 105.961 g of γ-butyrolactone (available from Mitsubishi Chemical Corporation), the mixture was stirred at a rotational speed of 200 rpm in a nitrogen atmosphere with a system internal temperature of 70° C., and a solution was obtained.

To the solution, 38.438 g (0.100 moles) of CpODA, and 26.490 g of γ-butyrolactone (available from Mitsubishi Chemical Corporation) were added all at once, after which 0.506 g of triethylamine (available from Kanto Chemical Co., Inc.) and 0.056 g of triethylene diamine (available from Tokyo Chemical Industry Co., Ltd.) were charged as imidation catalysts, the mixture was heated with a mantle heater, and the temperature in the reaction system was increased over a period of approximately 20 minutes to 190° C. The components removed by distillation were collected, and while the rotational speed was adjusted and tailored to the increase in viscosity, the temperature inside the reaction system was maintained at 190° C., and the system was refluxed for 3 hours.

Next, 478.614 g of γ-butyrolactone (available from Mitsubishi Chemical Corporation) was added, and the temperature inside the reaction system was cooled to 120° C., after which stirring was implemented again for approximately 3 hours to achieve homogenization, and a polyimide resin solution (1) having a solid content concentration of 10.0 mass % was obtained.

Next, 0.159 g (0.00074 moles) of 1,3-PBO was added as a crosslinking agent to 100 g the polyimide resin solution (1), and the mixture was stirred for one hour at room temperature, after which a polyimide varnish having a solid content concentration of 10.14 mass % and including the crosslinking agent and the polyimide resin was obtained. Note that the molar ratio of oxazolyl groups/carboxy groups was calculated based on the addition amount of 1,3-PBO and the addition amount of 3,5-DABA and was 1/1.

Next, a glass plate was coated with the obtained polyimide varnish, and then maintained for 20 minutes at 80° C. with a hot plate, after which the coated glass plate was heated in a hot air drier at a temperature of 350° C. for 30 minutes in a nitrogen atmosphere, the solvent was evaporated, and a film having a thickness of 50 μm was obtained.

Comparative Example 1

A polyimide varnish was prepared by the same method as that of Example 1 with the exception that the 1,3-PBO crosslinking agent was not added to the polyimide resin solution (1). That is, the polyimide resin solution (1) was used, as is, as the polyimide varnish.

The obtained polyimide varnish was then used to prepare a film by the same method as that of Example 1, and a film (asymmetric membrane) having a thickness of 50 μm was obtained.

Example 2

A polyimide resin solution was prepared by the same method as that of Example 1 with the exception that the amount of CpODA in Example 1 was changed from 38.438 g (0.100 moles) to 17.219 g (0.050 moles), and 11.208 g (0.050 moles) of HPMDA was added, and a polyimide resin solution (2) having a solid content concentration of 10 mass % was obtained.

Next, 0.176 g (0.00082 moles) of 1,3-PBO was added as a crosslinking agent to 100 g of the polyimide resin solution (2), and the mixture was stirred for one hour at room temperature, after which a polyimide varnish having a solid content concentration of 10.16 mass % and including the crosslinking agent and the polyimide resin was obtained. Note that the molar ratio of oxazolyl groups/carboxy groups was calculated based on the addition amount of 1,3-PBO and the addition amount of 3,5-DABA and was 1/1.

The obtained polyimide varnish was then used to prepare a film by the same method as that of Example 1, and a film (asymmetric membrane) having a thickness of 50 μm was obtained.

Example 3

A polyimide resin solution was prepared by the same method as that of Example 1 with the exception that 31.361 g (0.090 moles) of BAFL in Example 1 was changed to 48.991 g (0.090 moles) of HFA-mTB, and a polyimide resin solution (3) having a solid content concentration of 10.00 mass % was obtained.

Next, 0.122 g (0.00056 moles) of 1,3-PBO was added as a crosslinking agent to 100 g the polyimide resin solution (3), and the mixture was stirred for one hour at room temperature, after which a polyimide varnish having a solid content concentration of 10.13 mass % and including the crosslinking agent and the polyimide resin was obtained. Note that the molar ratio of oxazolyl groups/carboxy groups was calculated based on the addition amount of 1,3-PBO and the addition amount of 3,5-DABA and was 1/1.

The obtained polyimide varnish was then used to prepare a film by the same method as that of Example 1, and a film (asymmetric membrane) having a thickness of 50 μm was obtained.

Example 4

A polyimide resin solution was prepared by the same method as that of Example 1 with the exception that 31.361 g (0.090 moles) of BAFL in Example 1 was changed to 23.975 g (0.090 moles) of TMDA, and a polyimide resin solution (4) having a solid content concentration of 10.00 mass % was obtained.

Next, 0.169 g (0.00078 moles) of 1,3-PBO was added as a crosslinking agent to 100 g the polyimide resin solution (4), and the mixture was stirred for one hour at room temperature, after which a polyimide varnish having a solid content concentration of 10.14 mass % and including the crosslinking agent and the polyimide resin was obtained. Note that the molar ratio of oxazolyl groups/carboxy groups was calculated based on the addition amount of 1,3-PBO and the addition amount of 3,5-DABA and was 1/1.

The obtained polyimide varnish was then used to prepare a film by the same method as that of Example 1, and a film (asymmetric membrane) having a thickness of 50 μm was obtained.

Example 5

A polyimide varnish was prepared by the same method as that of Example 1 with the exception that 0.159 g (0.00074 moles) of 1,3-PBO as a crosslinking agent added in 100 g of the polyimide resin solution (1) in Example 1 was changed to 0.059 g (0.00074 moles) of PDO.

Note that the molar ratio of hydroxy groups/carboxy groups was calculated based on the addition amount of PDO and the addition amount of 3,5-DABA and was 1/1.

The obtained polyimide varnish was then used to prepare a film by the same method as that of Example 1, and a film (asymmetric membrane) having a thickness of 50 μm was obtained.

Comparative Example 2

A film (available from LOFO) having a film thickness of 50 μm and made from cellulose diacetate (TAC) was used.

[Chemical Formula 17]

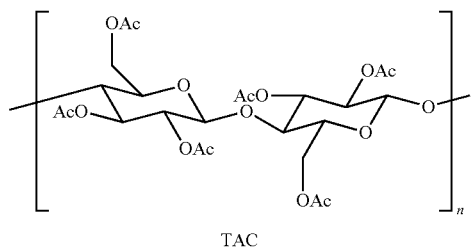

TAC

Evaluation of $CO_2$ Permeability and $CO_2$ Selectivity

The carbon dioxide permeability coefficient $P_{CO2}$ (Barrer) and the methane permeability coefficient $P_{CH4}$ were measured as described below using the films obtained in Examples 1 to 5 and Comparative Examples 1 and 2, and the degree of separation of carbon dioxide with respect to methane, namely $\alpha P_{CO2}/P_{CH4}$ was determined.

The unit of the permeability coefficient (P) is Barrer (1 Barrer=$10^{-10}$ cm$^3$ (STP)·cm/cm$^2$·sec·cmHg).

A gas having a composition of $CH_4/CO_2$=90/10 (mL/mL) and a temperature of 40° C. was supplied to the films obtained in the examples and comparative examples, and the permeability coefficient of each film was measured using an equal pressure method in which argon was supplied as a sweep gas to the permeation side at a rate of 10 mL/min.

$P_{CH4}$=($CH_4$ permeation flow rate)/(film surface area)·
(film thickness)·($CH_4$ supply partial pressure–
$CH_4$ permeation partial pressure)

$P_{CO2}$=($CO_2$ permeation flow rate)/(film surface area)·
(film thickness)·($CO_2$ supply partial pressure–
$CO_2$ permeation partial pressure)

$\alpha P_{CO2}/P_{CH4}=P_{CO2}/P_{CH4}$

The surface area of the films used in the tests was set to 8.5 cm$^2$. The results are shown in Table 1.

Evaluation of $CO_2$ Selective Recovery Rate

The $CO_2$ selective recovery rate was measured as described below using the films obtained in Examples 1 to 5 and Comparative Examples 1 and 2.

The films obtained in the examples and comparative examples were exposed for 2 weeks to 4 MPa of a mixed gas (25% $CO_2$, 40% methane, 20% ethane, and 15% propane), the films were then removed and placed in the atmosphere for one month, after which the $\alpha P_{CO2}/P_{CH4}$ was measured. The performance recovery rate was calculated from the $\alpha P_{CO2}/P_{CH4}$ before exposure to the mixed gas.

The $\alpha PCO_2/P_{CH4}$ was measured by the same equal pressure method as that of the previous paragraph.

TABLE 1

| | | | Examples | | | | | Comparative Examples | |
|---|---|---|---|---|---|---|---|---|---|
| | | | 1 | 2 | 3 | 4 | 5 | 1 | 2 |
| Polyimide resin | | | | | | | | | |
| Tetracarboxylic acid component (Numbers indicate molar ratio) | (a-1) | CpODA | 100 | 50 | 100 | 100 | 100 | 100 | TAC |
| | | HPMDA | 0 | 50 | 0 | 0 | 0 | 0 | |
| Diamine component (Numbers indicate molar ratio) | (b-1-1) | 3,5-DABA | 10 | 10 | 10 | 10 | 10 | 10 | |
| | (b-2-1) | BAFL | 90 | 90 | 0 | 0 | 90 | 90 | |
| | (b-2-2) | HFA-mTB | 0 | 0 | 90 | 0 | 0 | 0 | |
| | (b-2-3) | TMDA | 0 | 0 | 0 | 90 | 0 | 0 | |
| Crosslinking agent | | | | | | | | | |
| 1,3-PBO (Numbers indicate molar ratio of oxazolyl groups/carboxy groups) | | | 1/1 | 1/1 | 1/1 | 1/1 | — | — | — |
| PDO (Numbers indicate molar ratio of hydroxy groups/carboxy groups) | | | — | — | — | — | 1/1 | — | — |
| Evaluation | | | | | | | | | |
| $CO_2$ permeability | $PCO_2$ (Barrer) | | 21.6 | 15.2 | 77.0 | 23.5 | 223.0 | 32.2 | 8.3 |
| $CO_2$ selectivity | $\alpha P_{CO2}/P_{CH4}$ | | 42.0 | 87.3 | 37.0 | 39.2 | 31.6 | 46.4 | 25.0 |
| $CO_2$ selective recovery rate | $\alpha P_{CO2}/P_{CH4}$ recovery rate (%) | | 96 | 95 | 96 | 95 | 99 | 75 | 100 |

In Comparative Example 1, both excellent $CO_2$ permeability and excellent $CO_2$ selectivity could be achieved, but the $CO_2$ selective recovery rate was low. Moreover, in Comparative Example 2, the $CO_2$ selective recovery rate was high, but both the $CO_2$ permeability and the $CO_2$ selectivity were insufficient.

In contrast, the asymmetric membrane of the present embodiment achieved both excellent $CO_2$ permeability and $CO_2$ selectivity, and the $CO_2$ selective recovery rate was high.

INDUSTRIAL APPLICABILITY

The asymmetric membrane of the present invention is useful as a gas separation membrane for industrial gas and exhaust gas separation treatments.

The invention claimed is:

1. An asymmetric membrane comprising a crosslinked polyimide resin, the crosslinked polyimide resin being formed by crosslinking a polyimide resin by a crosslinking agent;
the polyimide resin including a structural unit (A) derived from tetracarboxylic dianhydride and a structural unit (B) derived from diamine;
the structural unit (A) including a structural unit (A-1) derived from a compound represented by Formula (a-1);
the structural unit (B) including a structural unit (B-1) derived from Formula (b-1), and a proportion of the structural unit (B-1) per 100 mol % of the structural unit (B) being from 0.1 to 50 mol %; and
the crosslinking agent being a compound having not less than two functional groups that bond with carboxy groups;

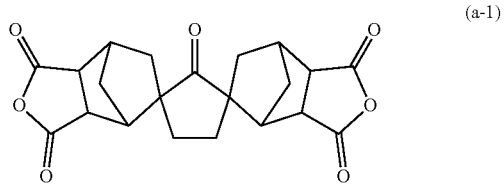
(a-1)

-continued

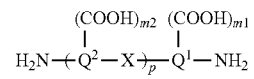
(b-1)

wherein, in Formula (b-1), $Q^1$ and $Q^2$ are each independently a group including an aromatic group, an aliphatic hydrocarbon group, and/or an alicyclic hydrocarbon group; X is a single bond, a substituted or unsubstituted alkylene group, a carbonyl group, an ether group, a group represented by Formula (b-1-i), or a group represented by Formula (b-1-ii); p is an integer from 0 to 2; m1 is an integer from 0 to 4; and m2 is an integer from 0 to 4; however, in a case where p is 0, m1 is an integer from 1 to 4; and

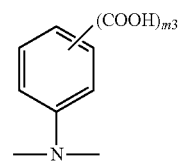
(b-1-i)

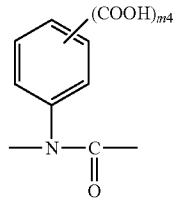

(b-1-ii)

wherein, in Formula (b-1-i), m3 is an integer from 0 to 5; in Formula (b-1-ii), m4 is an integer from 0 to 5; and in Formula (b-1), m1+m2+m3+m4 is 1 or greater; and in a case where p is 2, two X moieties and two m2 to m4 are each independently selected.

2. The asymmetric membrane according to claim 1, wherein the structural unit (B-1) is a structural unit (B-1-1) derived from a compound represented by Formula (b-1-1);

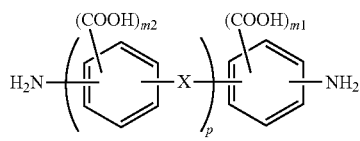

(b-1-1)

wherein, in Formula (b-1-1), X, p, m1, and m2 are the same as X, p, m1, and m2 of Formula (b-1).

3. The asymmetric membrane according to claim 1, wherein the structural unit (B-1) is a structural unit (B-1-11) derived from a compound represented by Formula (b-1-11)

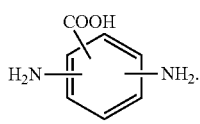

(b-1-11)

4. The asymmetric membrane according claim 1, wherein the structural unit (B) further includes at least one structural unit (B-2) selected from the group consisting of a structural unit (B-2-1) derived from a compound represented by Formula (b-2-1), a structural unit (B-2-2) derived from a compound represented by Formula (b-2-2), and a structural unit (B-2-3) derived from a compound represented by Formula (b-2-3), and a proportion of the structural unit (B-2) per 100 mol % of the structural unit (B) is from 10 to 99.9 mol %;

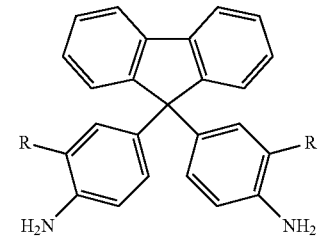

(b-2-1)

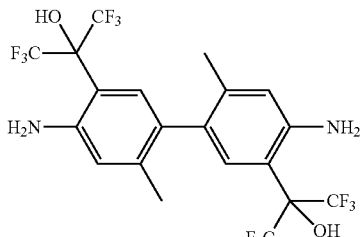

(b-2-2)

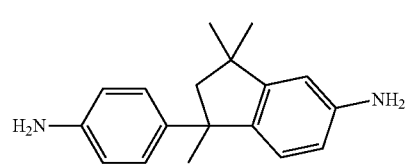

(b-2-3)

wherein, in Formula (b-2-1), R is each independently a hydrogen atom, a fluorine atom, or a methyl group.

5. The asymmetric membrane according to claim 1, wherein the crosslinking agent is a compound having not less than two oxazolyl groups in a molecule.

6. The asymmetric membrane according to claim 1, wherein the crosslinking agent is a compound having not less than two hydroxy groups in a molecule.

7. The asymmetric membrane according to claim 1, wherein the asymmetric membrane is in a hollow fiber form.

8. The asymmetric membrane according to claim 1, wherein the asymmetric membrane is in a film form.

9. The asymmetric membrane according to claim 1, wherein the asymmetric membrane is a gas separation membrane.

* * * * *